(12) United States Patent
Chiueh

(10) Patent No.: US 6,302,364 B1
(45) Date of Patent: Oct. 16, 2001

(54) PNEUMATIC CONTAINER HOLDER

(75) Inventor: Theresa Tiwen Chiueh, Ann Arbor, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/186,231

(22) Filed: Nov. 4, 1998

(51) Int. Cl.⁷ .................................................... A47K 1/08
(52) U.S. Cl. .................. 248/311.2; 248/313; 248/316.2; 248/506; 206/545; 294/119.3
(58) Field of Search ................................ 248/310, 311.2, 248/312.1, 313, 316.2, 362, 506, 694, 346.2; 206/522, 545; 294/119-3

(56) References Cited

U.S. PATENT DOCUMENTS

| | | | |
|---|---|---|---|
| 2,932,378 | 4/1960 | Smith | 198/131 |
| 2,932,825 | 4/1960 | Vaughan, Jr. | 198/131 |
| 3,028,702 * | 4/1962 | St. Cyr | 45/68.4 |
| 4,015,940 * | 4/1977 | Conlon | 23/259 |
| 4,964,600 * | 10/1990 | Lee | 248/146 |
| 4,969,618 * | 11/1990 | Thompson | 248/152 |
| 5,316,255 | 5/1994 | Marcusen | 248/205.8 |
| 5,397,000 * | 3/1995 | Holte et al. | 206/545 |
| 5,536,056 | 7/1996 | Clarke et al. | 294/119.3 |
| 5,560,578 * | 10/1996 | Schenken et al. | 248/313 |
| 5,704,579 | 1/1998 | Celentino et al. | 248/311.2 |

FOREIGN PATENT DOCUMENTS

| | | |
|---|---|---|
| 1238423 | 2/1959 | (FR) . |
| 629620 | 7/1963 | (FR) . |
| 769792 | 3/1957 | (GB) . |
| 851475 | 10/1960 | (GB) . |

* cited by examiner

Primary Examiner—Ramon O. Ramirez
Assistant Examiner—Walter Landry
(74) Attorney, Agent, or Firm—Leslie C. Hodges

(57) ABSTRACT

A container holder adapted for use with a structure has a pneumatically operated bladder member for selectively adjusting the size of a container holder depression or opening. The bladder member is positioned on the periphery of the container holder and is inflated or deflated using a pump mechanism in order to vary the size of a container receiving aperture.

26 Claims, 9 Drawing Sheets

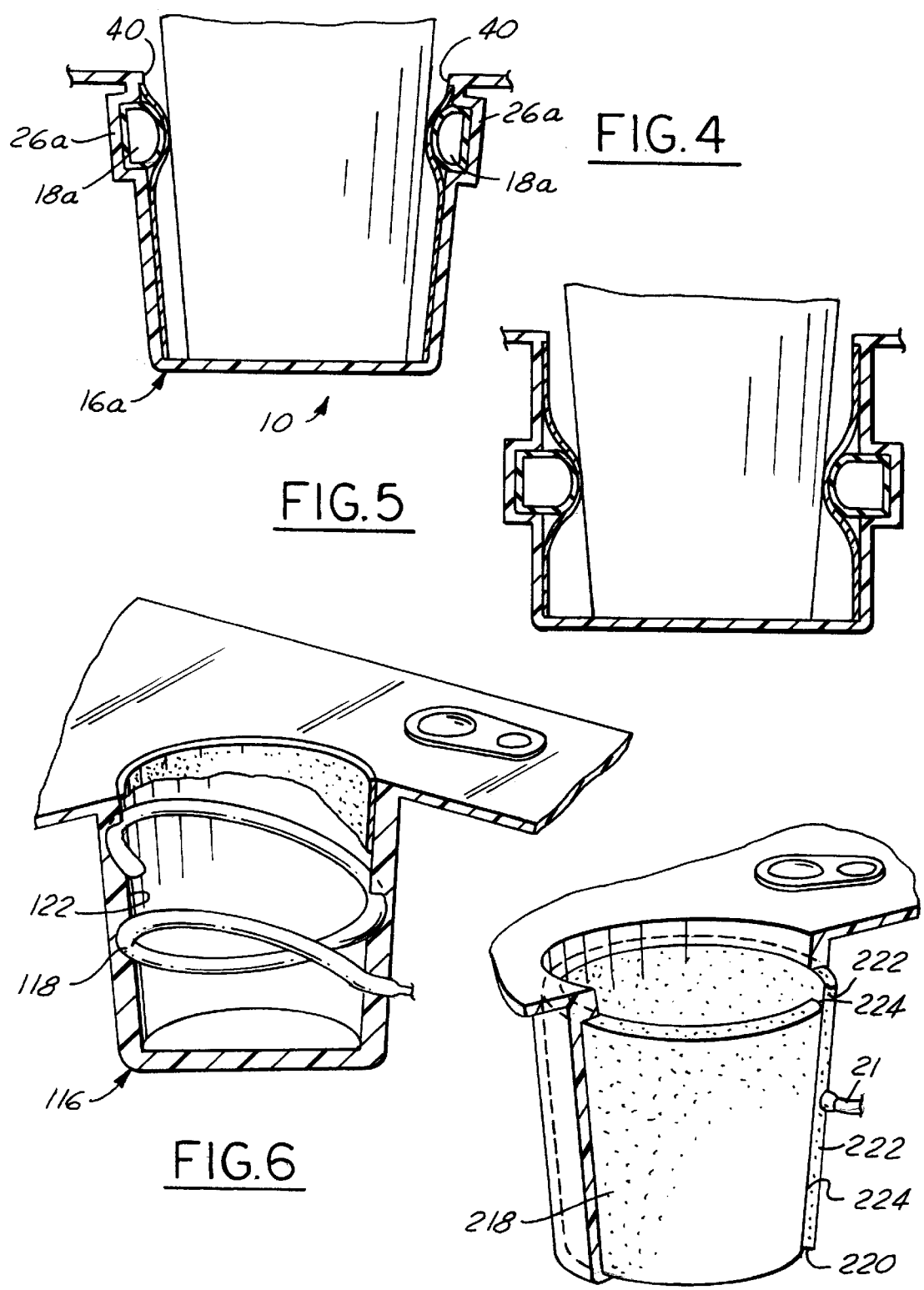

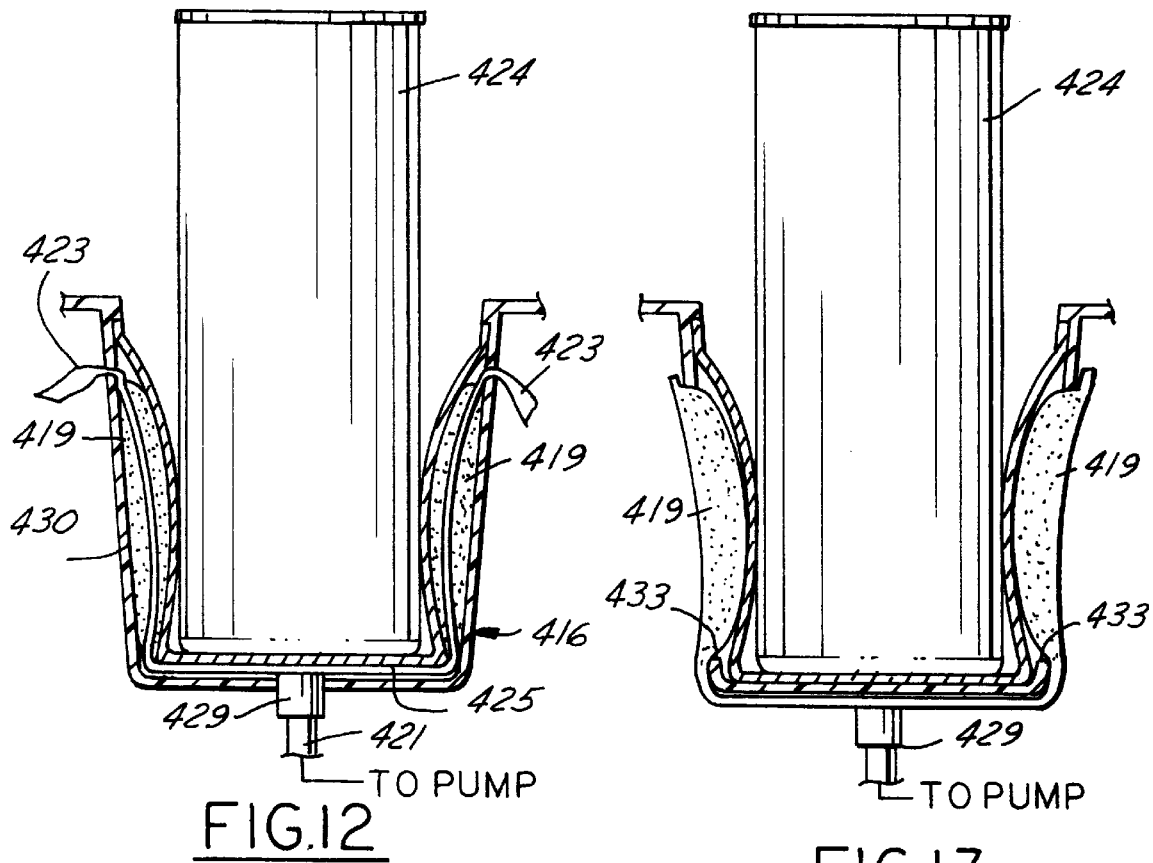
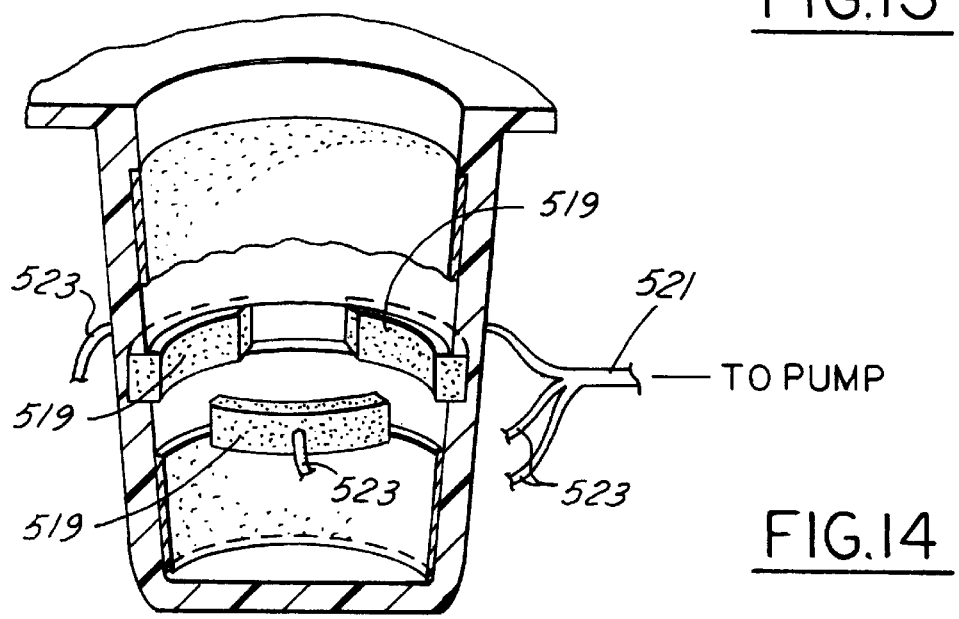

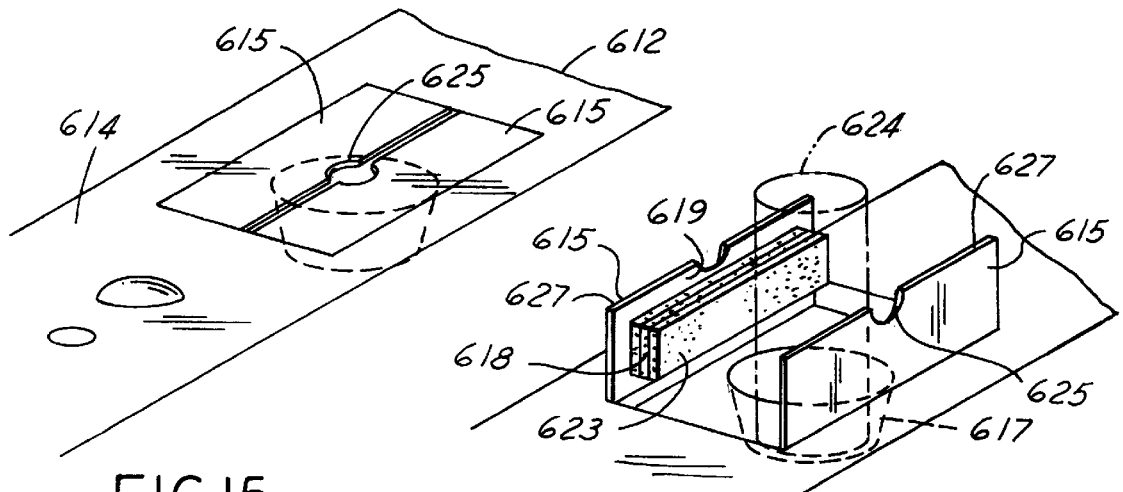
FIG.15
FIG.16
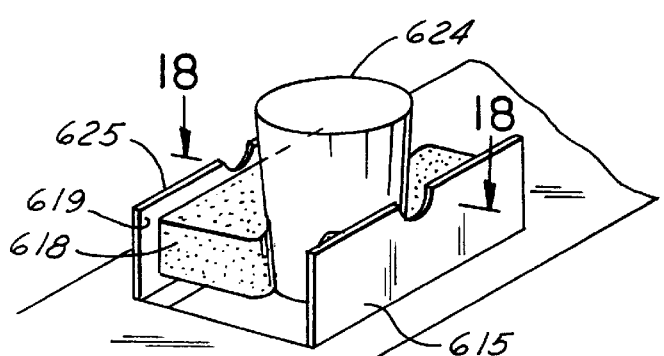
FIG.17
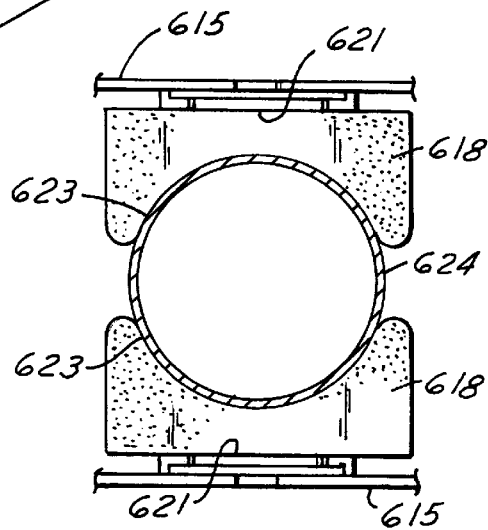
FIG.18

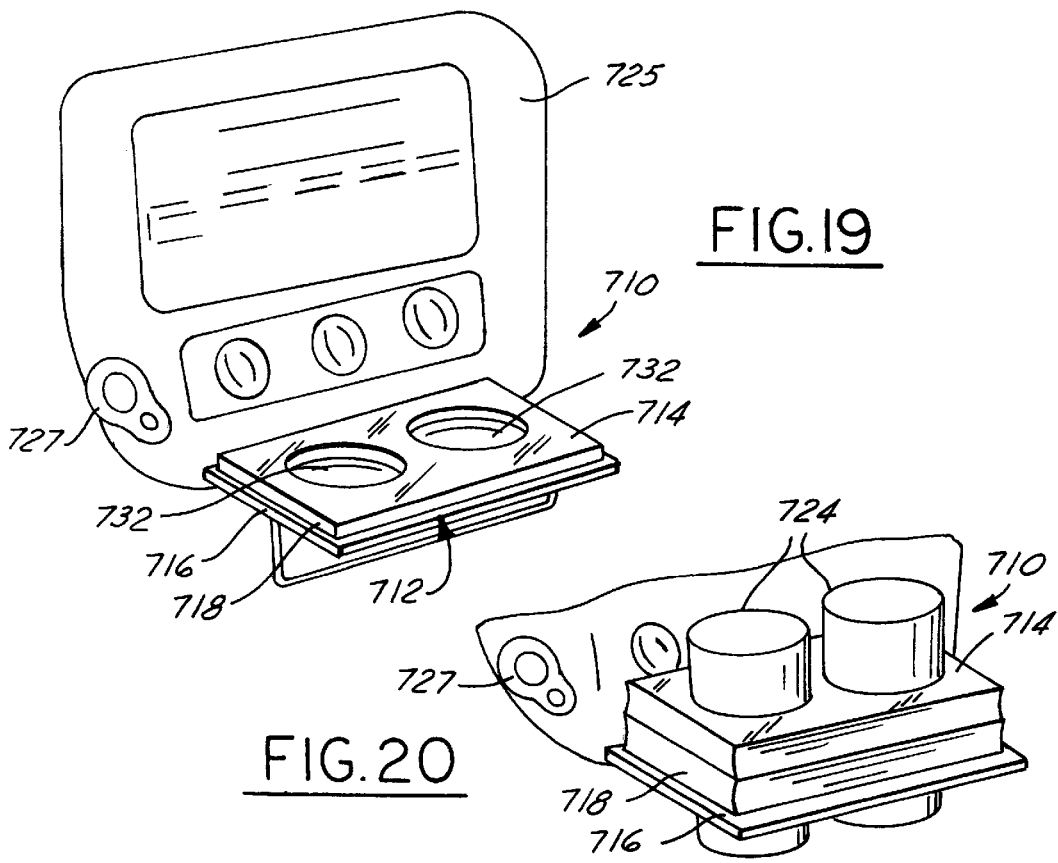
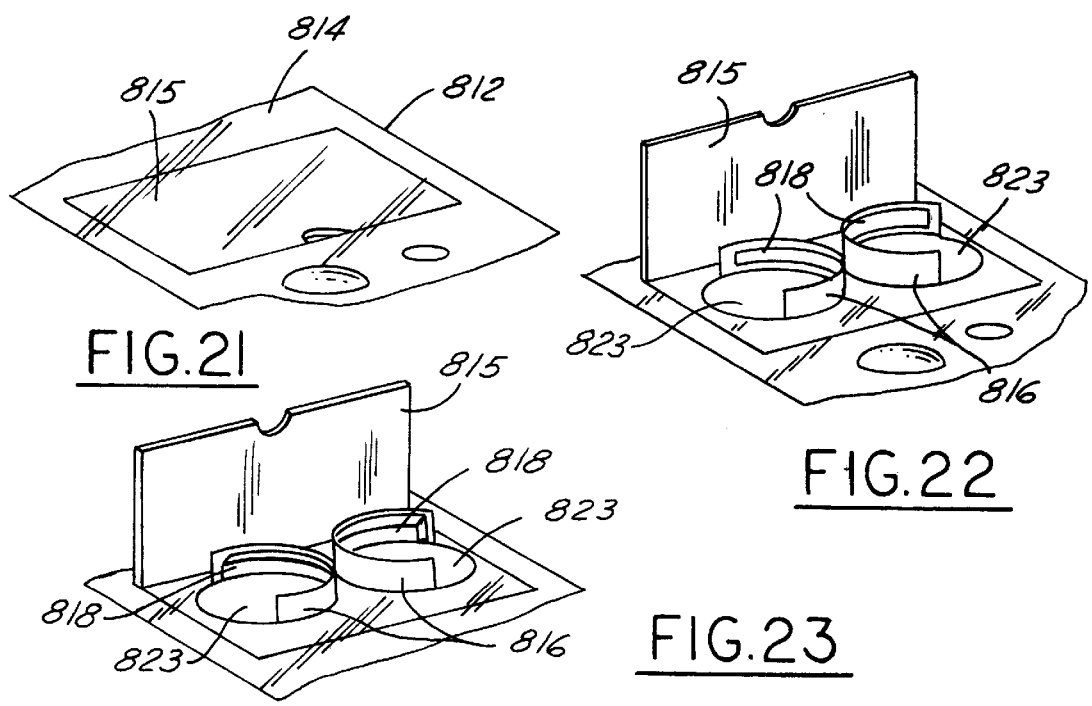

US 6,302,364 B1

PNEUMATIC CONTAINER HOLDER

FIELD OF THE INVENTION

The present invention relates to holders for containers in general, and more specifically to a container holder which will securely hold containers of a variety of sizes.

BACKGROUND OF THE INVENTION

Numerous approaches have been taken for holding beverage containers of various sizes. Some of these approaches include depressions in the molded plastic of an instrument panel or center console and trays or drawers that slide out from an armrest or under the dash with openings for beverage containers.

One problem with existing container holders is the inability to accommodate containers of various sizes. Containers which are smaller than the depression or opening are not held securely and may tip easily. Containers which are larger than the depression or opening do not fit into the holder.

Recently, some container holders have included flexible inserts to allow for a greater variety of container sizes. However, such holders may not hold a smaller container securely. Also, larger containers may be difficult to insert and remove from the container holder. Therefore, a container holder which can adjust to the size of the container is needed.

SUMMARY OF THE INVENTION

The present invention overcomes the disadvantages of the related art by providing a pneumatically operated means for selectively adjusting the size of the container holder depression or opening. An air bladder positioned on the periphery, or a portion thereof, of the container holder is inflated or deflated using a pump mechanism in order to change the size of the container receiving aperture. The container holder is adapted to be attached to, or integral with, a surrounding structure, such as a vehicle panel, console, or seat armrest.

An advantage of the present invention is a container holder which is capable of securely holding containers of varying sizes.

Another advantage is a container holder in which the container holder opening or depression size can be selectively varied to fit the size of a container.

Still another advantage of the present invention is a container holder which is easily operated.

A feature of the present invention is a pneumatically inflatable bladder member positioned around a periphery, or portion thereof, of the container holder.

Another feature is a pump attached to the bladder member for selectively inflating or deflating the bladder member.

BRIEF DESCRIPTION OF THE DRAWINGS

These and other objects, advantages, and features of the present invention will be apparent to those skilled in the art upon reading the following description with reference to the accompanying drawings, in which:

FIG. 4 is a cross-sectional view of a second embodiment of the present invention similar to FIG. 2 but having an inflatable bladder along the upper rim of the container holder;

FIG. 5 is a cross-sectional view of the present invention similar to FIG. 2 having a generally cylindrical container receiving member;

FIG. 6 is a perspective view of a third embodiment of a pneumatic cup holder according to the present invention showing an inflatable bladder spirally positioned around an inner surface of a container holder;

FIG. 7 is a perspective view of a fourth embodiment of a pneumatic container holder of the present invention showing an inflatable bladder sleeve which fits along an inner surface of a container holder;

FIG. 12 is a cross-sectional view taken along line 12—12 of FIG. 10 showing the pneumatic container holder in a deflated state;

FIG. 13 is a cross-sectional view similar to FIG. 12 but shown in an inflated state gripping a container;

FIG. 14 is a perspective view of a sixth embodiment of the present invention showing an inflatable container holder bladder with circumferentially spaced bladder members;

FIGS. 15–17 show perspective views of a seventh embodiment of the pneumatic container holder according to the present invention showing inflatable bladders on an underside of concealment flaps movable between a closed position (FIG. 15) and an open position (FIGS. 16 and 17) to cover and uncover a container well, the flaps having inflatable bladders movable between inflated and deflated states (FIGS. 16 and 17, respectively);

FIG. 18 is a cross-sectional view taken along line 18—18 of FIG. 17;

FIG. 19 is a perspective view of an eighth embodiment of the present invention showing a tray container holder having an inflatable bladder in a deflated state;

FIG. 20 is a perspective view similar to FIG. 19 but showing the inflatable bladder in an inflated state;

FIGS. 21–23 are perspective views of a ninth embodiment of the present invention showing a concealable flap in a vehicle's surface in a closed position (FIG. 21) and in an open position (FIGS. 22 and 23) allowing a set of container arms to deploy, the container arms having an inflatable bladder on an inner surface thereof movable between a deflated state (FIG. 22) and an inflated state (FIG. 23);

DETAILED DESCRIPTION OF THE PREFERRED EMBODIMENTS

Figure 1:
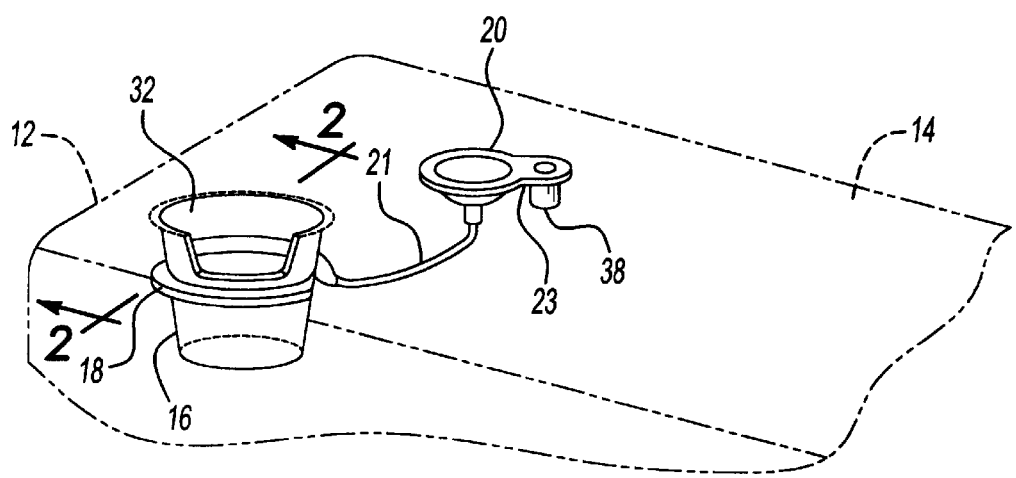
FIG. 1 is a perspective view of a first embodiment of a pneumatic container holder according to the present invention showing an inflatable bladder around the center of a container holder.
Figure 2:
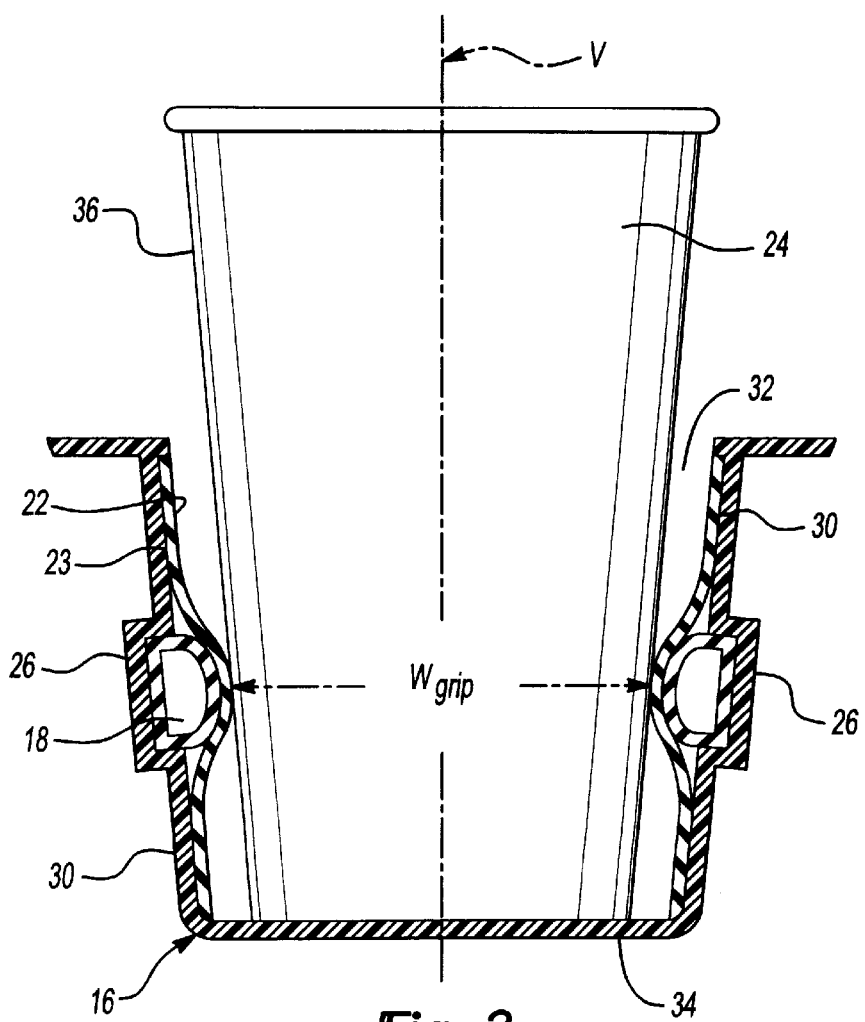
FIG. 2 is a cross-sectional view taken along line 2—2 of FIG. 1, shown in an inflated state gripping a container.
Figure 3:
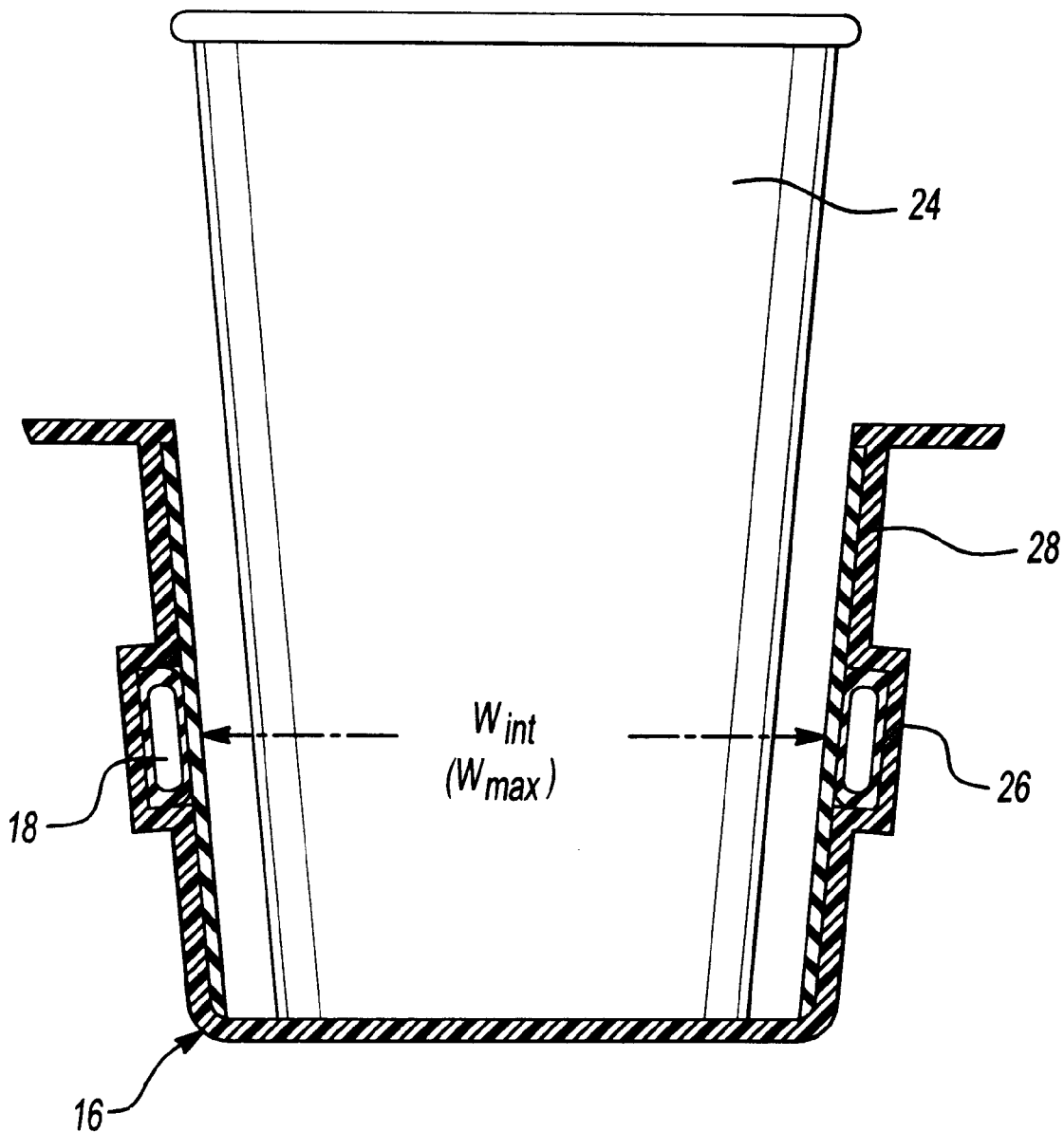
FIG. 3 is a cross-sectional view similar to FIG. 2 but shown in a deflated state.

Turning now to the drawings, and in particular to FIG. 1 thereof, a pneumatic container holder, generally shown at reference number 10, is shown positioned in a structure 12. The structure 12 can be, for example, a table, tray, console, or any other structure in which a container holder is desired. The structure 12 has an upper surface 14. The pneumatic container holder 10 is comprised of a container receiving member 16 having a generally vertical axis V and side walls 30 thereabout, a pneumatically operated bladder member 18 disposed along a portion of a periphery of the container receiving member for pneumatically varying a gripping width of the container receiving member, and a pump member 20 operatively connected with the bladder member 18 to adjust air pressure therein so as to selectively vary a contact surface 22 (FIGS. 2–5) of the container receiving member with a container 24 when placed therein. As seen in FIGS. 2 and 3, the bladder 18 may be located in a channel 26 circumferentially traversing the container holder 16. Preferably, the container receiving member 16 has a flexible membrane 28, or skin, along the generally vertical sides 30 to prevent dirt and other contamination from contacting the bladder member 18, to increase the durability of the bladder member 18 and to generally improve the appearance of the container holder 10. The container receiving member 16 can be formed in the structure 12 by creating an opening 32 in the surface 14 (FIGS. 1 and 2) and forming a depression in the structure. The depression is typically formed in a cylindrical shape with a side 30 and a bottom 34 (FIGS. 2–4). The side 30 may be slightly angled as seen in FIG. 4 or may be substantially vertical, as seen in FIG. 5, to form a generally cylindrical depression.

Still referring to FIGS. 1–3, a container 24 having an outer diameter smaller than the inner diameter of the container receiving member 16 can be accommodated by the pneumatic container holder 10 of the present invention to retain it in a secure fashion. This is accomplished by placing the container 24 into the container receiving member 16 and inflating the bladder 18 with the pump 20 until the bladder 18, or skin 28, securedly contacts or grips an outer surface 36 of the container 24. When the bladder 18 is in a deflated state (FIG. 3), the container 24 may be inserted into the container receiving member 16 without interference. Once therein, the bladder 18 may be moved to an inflated state (FIG. 2) by using the pump 20. When release of the container 24 from the container holder 10 is desired, a relief valve 38 may be depressed (FIG. 1) which allows air to escape from the bladder member, returning it to a deflated state (FIG. 3).

Turning now to FIG. 4, an alternate embodiment of the pneumatic container holder 10 is shown having an inflatable bladder member 18a positioned in a channel 26a near an upper rim 40 of the container receiving member 16a. The location of channel 26a and the inflatable bladder 18a located therein may be dictated by the size of containers to be held within the container holder, the space available for the container holder relative to the surrounding structure, and other design considerations.

The bladder 18a may be made of a durable, flexible material, and the container receiving member 16a can be made of any suitable material, including but not limited to a hard plastic, such as polypropylene.

Connecting the pump 20 and the bladder member 18 is a hose or tube 21 (FIG. 1) for communicating air therebetween. Preferably, the pump 20 and relief valve 38 are placed in a flange 23 and the assembly is mounted in a convenient location on surface 14.

Figures 8, 9:
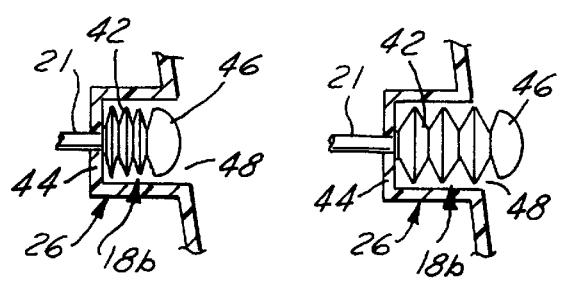
FIGS. 8 and 9 are side sectional views of an inflatable bellows bladder placed in a channel along an interior surface of a container holder shown in deflated and inflated states, respectively.

Referring now to FIGS. 8 and 9, an embodiment of an alternate bladder member 18b is shown in inflated and deflated states, respectively. The bladder member 18b is comprised of a bellows section 42 mounted toward a closed end 44 of the channel 26 with the tube 21 extending therefrom and a contact portion 46 mounted in an open end 48 of the channel 26 for movement thereunto when the bladder member 18b is in a deflated state (FIG. 8) and for movement thereoutof when the bladder member 18b is in an inflated state (FIG. 9). The bladder member 18b, with the bellows feature as described, may permit more compact packaging, better control, and a greater range of container gripping diameter variation within the container holder since the bellows portion 42 directs the contact portion 46 in a radial direction with respect to a center vertical axis through the container (not shown).

As seen in FIGS. 6 and 7, other variations of a pneumatic container holder employing an inflatable bladder member for effectively varying a gripping width of the container holder with respect to a container therein are shown. In FIG. 6, a bladder member 118 is shown spirally mounted around an inner surface 122 of a container bolder 116. The bladder member 118 may have any suitable cross-sectional shape, including but not limited to, circular, elliptic, oval, square, rectangular, in addition to the bellows shape described above. Preferably, the bladder member 118 is mounted in a channel (not shown) similar to those previously described with reference to FIGS. 2–5.

A sleeve-type bladder 218 (FIG. 7) comprises a generally cylindrically shaped member which fits within a container receiving member and expands or contracts under air pressure from the tube 21 to vary the effective gripping width of the container holder. For purposes of this disclosure, effective gripping width indicates that diameter or other opening through which a container passes within the container holder. Preferably, the bladder member 218 has a vertical slot 220 defined by opposite ends 222, 224 to permit expansion of the bladder member 218 when moved between the deflated and inflated states.

Figure 10:
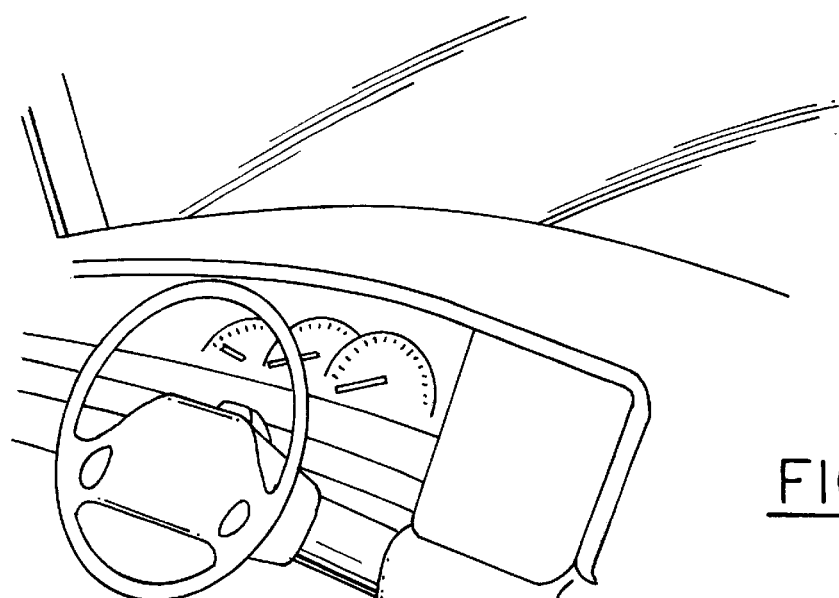
FIG. 10 is a perspective view of a container holder of the present invention and controls therefor shown in an automotive center console.

Turning now to FIG. 10, a pneumatic container holder 310, according to an alternate embodiment of the present invention, is shown mounted in an automotive vehicle center console 311. The pump 320 and relief valve 338 are preferably mounted in the console 311, and as seen in FIG. 10, both a driver and a front passenger container holder may be mounted within the console 311. It should be understood that any of the embodiments of the pneumatic container holder of the present invention may be mounted as shown in FIG. 10 or may be mounted in other suitable locations within an automotive vehicle, within any other mobile vehicle, or within any structure in which a container holder is desired.

Figure 11:
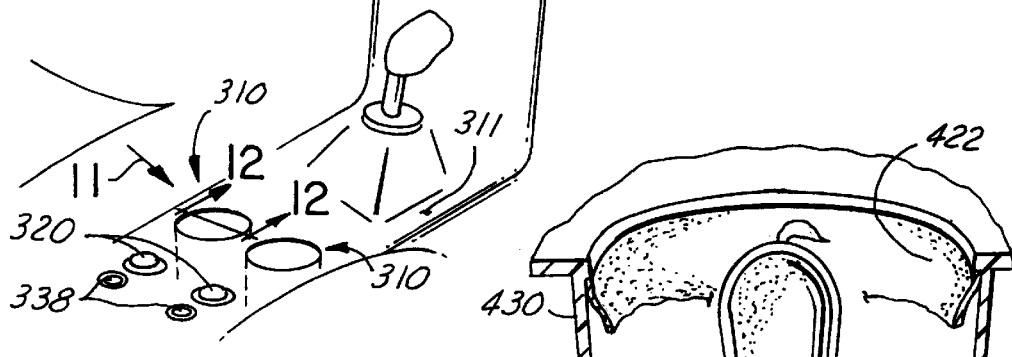
FIG. 11 is a perspective view taken, partially cut away, in the direction of line 11 of FIG. 10 of a fifth embodiment of a pneumatic container holder according to the present invention showing an inflatable bladder having vertically extending fingers along an inner surface of a container holder.

Another embodiment of pneumatic container holder according to the present invention is shown in FIG. 11. A container holder 410 comprises a container receiving member 416 having a bladder member 418 disposed along an inner surface 422 thereof. The bladder member 418 is comprised of circumferentially spaced bladder appendages which, in this embodiment, take the form of vertically extending fingers 419, the fingers 419 each comprised of a pair of parallel layers connected along the periphery 417 to form an inflatable member, preferably connected at a base portion 425 along a base 427 of the container receiving member 416. The base portion 425 has connected thereto an adapting nub 429 for receiving one end of the tube 421 therein, the other end of the tube 421 connected to the pump 420. The pump 420 may have a flexible pump button 431 to permit finger or thumb operation thereof. The relief valve 438 is also operated by a finger for release of pressure from within the fingers 419 when it is desired to remove a container from within the container receiving member 416. While the fingers 419 are seen connected parallel to the pump 420 through tube 21, it should be understood that such fingers may also be connected in series. In operation, a container is placed into the container receiving member 416 with the bladder member 418 in a deflated state so that the fingers 419 retract toward the side wall 430 of the container receiving member, thus increasing the diameter, or opening through which the container 424 may fit. After the container 424 has been placed within the container receiving member 416, the pump 420 is operated so that the bladder member 418 is inflated and the fingers 419 decrease the effective gripping width of the container holder and contact vertical sides of the container 424 so as to securely hold it in place (FIGS. 12 and 13). In FIG. 12, the fingers 419 are mounted in the container receiving member 416 and attached thereto with locking tabs 423. Alternatively, the fingers 419 of bladder member 418 may be mounted outside the container receiving member 416 and expand inwardly through openings 433 to contact the container 424 (FIG. 13).

Turning now to FIG. 14, an alternative embodiment of a pneumatic container holder according to the present invention is shown having a plurality of substantially horizontal, circumferentially spaced bladder members 519 connected by tubes 523 and having tube 521 connected with the pump (not shown). The bladder members 519 may be connected in parallel with the pump, or alternatively may be connected in series (not shown).

The pneumatic container holder of the present invention may be used in various settings; for example, as in concealed a container holder as shown in FIGS. 15–18. A structure 612 has an upper surface 614 in which a pair of concealment flaps 615 are mounted for movement between a concealing position (FIG. 15) substantially planar with the surface 614, and an open position (FIGS. 16, 17) substantially perpendicular to the surface 614 so as to cover and uncover a container well 617 formed in the structure 612 below the surface 614. The flaps 615 each have an inflatable bladder member 618 mounted on an underside 619 thereof (FIGS. 16–18). The bladder members 618 are directly opposed when the flaps 615 are in the open position in a deflated state (FIG. 16), and have an attachment surface 621 attached to the concealment flap 615 and a gripping surface 623 which expands into a concave arcuate shape when the container holder is in an inflated state for securely gripping a side of a container 624 placed within the well 617 (FIGS. 17 and 18).

In operation, the concealment flap 615 may be opened using finger openings 625 formed in a center of opposing edges 627, thus revealing well 617 (FIG. 16). The container 624 may then be placed within well 617 and the opposing bladder member 618 inflated using a pump (not shown) as described above, to securely grip the container 624 between the opposing bladder members (FIGS. 17 and 18). Release of pressure form within the bladder members is accomplished as heretofore described, the container 624 may be removed from the well 617, and the concealment flaps closed to cover the well.

In FIGS. 19 and 20, yet another embodiment of the present invention is shown in the form of a tray container holder 710 having an inflatable bladder. The tray container holder comprises a tray member 712 having a pair of container receiving openings 732 formed in a surface 714 thereof. The tray has a base 716 and an inflatable bladder 718 horizontally sandwiched between the upper surface 714 and the base member 716 (FIG. 19). The container receiving opening 732 extends through the surface 714, the bladder member 718 and the base member 716. The container receiving opening 732 are preferably formed of a larger diameter than most containers to be placed therein so that upon inflation of the bladder member 718, the grip width or diameter of the container receiving opening 732 decreases so as to grip the containers 724 therein (FIG. 20). The tray 712 may be mounted to a suitable structure, for example, to a convenience console 725, which may be, for example, a portion of an instrument panel in an automotive vehicle. The tray 712 may be movable into a concealed position within the automotive panel (not shown).

In operation, a container 724 is placed within a container receiving opening 732, and the bladder member 718 is inflated form the deflated state (FIG. 19) to an inflated state (FIG. 20) so as to grip the container therein. The process is reversed to remove the container from the pneumatic container holder 710.

Another concealable pneumatic container holder embodiment is shown in FIGS. 21–23. A concealment flap 815 mounted flush and substantially parallel to a surface 814 of a structure 812 is movable between a closed position (FIG. 21) and an open position (FIGS. 22 and 23). When the flap 815 is in the open position, a pair of container receptacles 823 are revealed partially bounded by arcuate container arms 816 having inflatable bladder members 818 mounted on an inner surface 819 thereof (FIGS. 22 and 23). The bladder members 818 are movable between a deflated state (FIG. 22), obstructing the container holder openings 823 to allow a container to be placed therein, and an inflated state (FIG. 23) in which the effective gripping width of the container arms is varied to contact the vertical side of the container to securely grip and hold it within the container holder. The bladder 818 are pneumatically operated between the deflated and inflated states, as previously described with respect to other embodiments disclosed herein.

Figure 24:
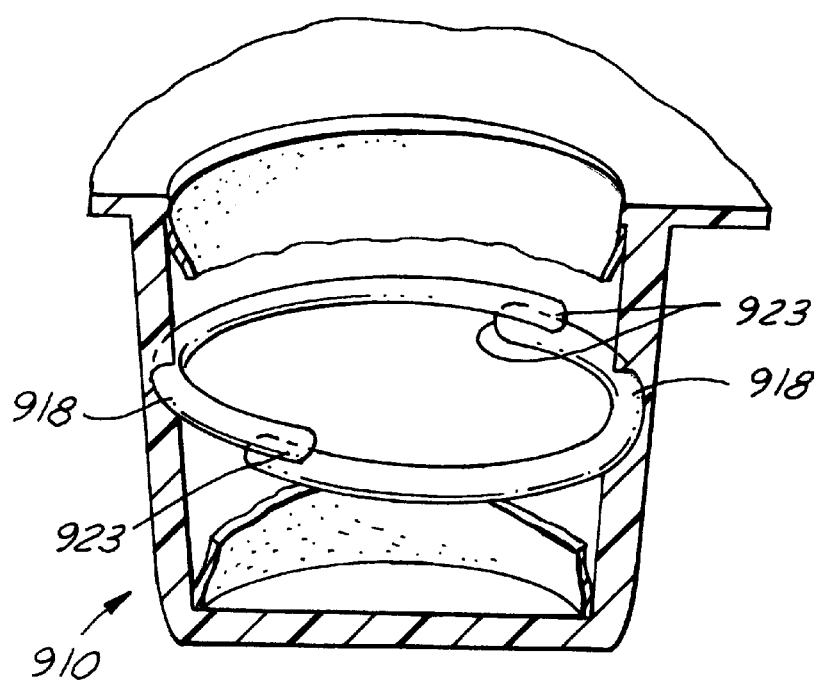
FIG. 24 is a perspective view of a tenth embodiment of the present invention showing a container holder having a pair of overlapping inflatable bladder members.
Figure 25:
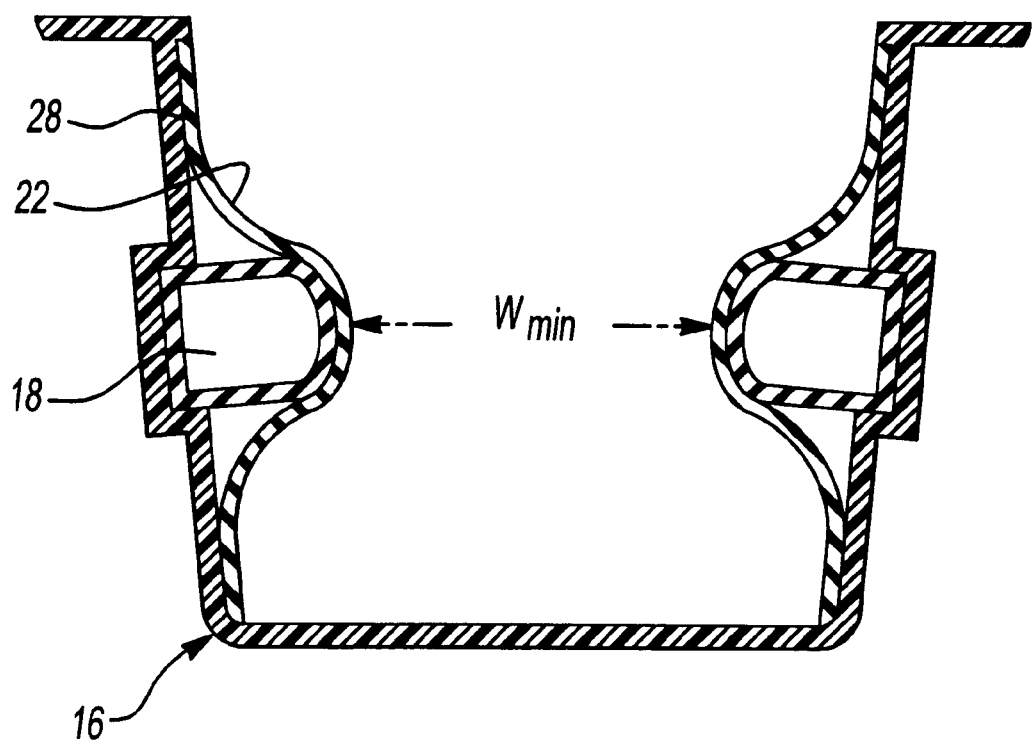
FIG. 25 is a cross-sectional view similar to FIG. 2, but in a fully inflated state.

In FIG. 24, a container holder 910 has a pair of semi-circular, tubular bladder members 918 which overlap at ends 923. When inflated, the bladder members 918 expand radially inwardly and overlap each other to decrease the effective width of container receiving member.

Although the preferred embodiment of the present invention has been disclosed, various changes and modifications may be made without departing from the scope of the invention as set forth in the appended claims.

What is claimed is:

1. A pneumatic containerholder adaptable for attachment to a structure, comprising:

container receiving means for receiving a container therein and adapted to be attached to the structure, said container receiving means having a generally vertical axis and side walls spaced about said axis;

inwardly inflatable bladder means disposed generally circumferentially about said generally vertical axis along said side walls, wherein said bladder means has a maximum gripping width when minimally inflated and a minimum gripping width when maximally inflated, wherein said maximum gripping width is substantially equivalent to an interior width as measured within said side walls proximate said bladder means; and pump means for selectively adjusting air pressure within the bladder means so as to vary the gripping width thereof between said maximum and minimum gripping widths.

2. A pneumatic containerholder according to claim 1 wherein the bladder means comprises a tubular shaped member.

3. A pneumatic containerholder according to claim 1 wherein the bladder means comprises a sleeve shaped member.

4. A pneumatic containerholder according to claim 1 wherein the bladder means comprises a plurality of substantially discontiguous circumferentially spaced bladder members.

5. A pneumatic containerholder according to claim 4 wherein the bladder members are vertically extending.

6. A pneumatic containerholder according to claim 4 wherein the bladder members are horizontally extending.

7. A pneumatic containerholder according to claim 1 wherein the container receiving means comprises a generally cylindrically shaped depression in a surface of the structure.

8. A pneumatic containerholder according to claim 7 including a membrane within the depression covering the bladder means.

9. A pneumatic containerholder according to claim 1 wherein the container receiving means comprises an annular member defining a container receiving opening, the annular member adapted to be attached to the structure.

10. A pneumatic containerholder according to claim 1 wherein the pump means comprises:
   air pressurizing means for supplying pressurized air to the bladder means;
   conduit means for providing fluid communication between the bladder means and the air pressurizing means; and
   control valve means for regulating airflow to and from the bladder means.

11. A pneumatic containerholder according to claim 1, wherein the bladder means comprises a bellows member radially inflatable toward said generally vertical axis.

12. A pneumatic containerholder according to claim 1, wherein the bladder means is at least partially recessed within said side walls of said container receiving means.

13. A pneumatic containerholder adaptable for attachment to a structure, comprising;
   means defining an opening for receiving a container and adapted for attachment to the structure, said means having a generally vertical axis and side walls spaced about said axis;
   an inwardly inflatable pneumatically operated bladder member disposed generally circumferentially about said generally vertical axis along said side walls, wherein said bladder member has a maximum gripping width when minimally inflated and a minimum gripping width when maximally inflated, wherein said maximum gripping width is substantially equivalent to an interior width as measured within said side walls proximate said bladder member; and
   a pump operatively connected with the bladder member to adjust air pressure therein so as to selectively vary the gripping width of the bladder member between said maximum and minimum gripping widths.

14. A pneumatic containerholder according to claim 11 wherein the bladder member comprises a plurality of substantially discontiguous circumferentially spaced bladder appendages.

15. A pneumatic containerholder according to claim 14 wherein the bladder appendages are vertically extending.

16. A pneumatic containerholder according to claim 14 wherein the bladder appendages are horizontally extending.

17. A pneumatic containerholder according to claim 11 wherein the pump comprises:
   air pressurizing means for supplying pressurized air to the bladder member;
   conduit means for providing fluid communication between the bladder member and the air pressurizing means; and
   control valve means for regulating airflow to and from the bladder member(s).

18. A pneumatic containerholder according to claim 11 wherein the bladder member comprises a tubular shaped member.

19. A pneumatic containerholder according to claim 11 wherein the bladder member comprises a sleeve shaped member.

20. A pneumatic containerholder according to claim 11, wherein the bladder means comprises a bellows member radially inflatable toward said generally vertical axis.

21. A pneumatic containerholder according to claim 11, wherein the bladder member is at least partially recessed within said side walls.

22. A pneumatic containerholder adapted to be attached to a structure, comprising:
   a container receiving member having a generally vertical axis and side walls about said axis defining a depression within the structure;
   an inwardly inflatable pneumatically operated bladder member disposed generally circumferentially around an inner side wall surface of the container receiving member, wherein said bladder member has a maximum gripping width when minimally inflated and a minimum gripping width when maximally inflated, wherein said maximum gripping width is substantially equivalent to an interior width as measured within said side walls proximate said bladder member; and
   a pump operatively connected with the bladder member to adjust air pressure therein so as to selectively vary said inner side wall surface between said maximum and minimum gripping widths.

23. A pneumatic containerholder according to claim 18 wherein the bladder member is positioned between a side of the container receiving member and a flexible membrane disposed around an inner surface of the container receiving member.

24. A pneumatic containerholder according to claim 18 wherein the pump comprises:
   air pressurizing means for supplying pressurized air to the bladder member;
   conduit means for providing fluid communication between the bladder member and the air pressurizing means; and
   control valve means for regulating airflow to and from the bladder member.

25. A pneumatic containerholder according to claim 18, wherein the bladder means comprises a bellows member radially inflatable toward said generally vertical axis.

26. A pneumatic containerholder according to claim 18, wherein the bladder member is at least partially recessed within said side walls of said container receiving member.

* * * * *